United States Patent
Saffar et al.

(10) Patent No.: US 11,461,467 B2
(45) Date of Patent: Oct. 4, 2022

(54) DETECTING AND MITIGATING MALICIOUS SOFTWARE CODE EMBEDDED IN IMAGE FILES USING MACHINE LEARNING TECHNIQUES

(71) Applicant: EMC IP Holding Company LLC, Hopkinton, MA (US)

(72) Inventors: Or Herman Saffar, Beer Sheva (IL); Amihai Savir, Sansana (IL); Yevgeni Gehtman, Mod'In (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 689 days.

(21) Appl. No.: 16/400,299

(22) Filed: May 1, 2019

(65) Prior Publication Data
US 2020/0349257 A1    Nov. 5, 2020

(51) Int. Cl.
G06F 21/56 (2013.01)
G06N 3/08 (2006.01)
G06N 5/04 (2006.01)
G06N 20/00 (2019.01)

(52) U.S. Cl.
CPC .......... *G06F 21/563* (2013.01); *G06F 21/564* (2013.01); *G06N 3/08* (2013.01); *G06N 5/046* (2013.01); *G06N 20/00* (2019.01)

(58) Field of Classification Search
CPC ...... G06F 21/563; G06F 21/565; G06F 21/57; G06F 21/564; G06N 20/00; G06N 3/08; G06N 5/046
See application file for complete search history.

(56) References Cited

U.S. PATENT DOCUMENTS

| | | | | |
|---|---|---|---|---|
| 8,689,331 | B2 * | 4/2014 | Feeney | G06F 21/563 726/24 |
| 9,690,938 | B1 * | 6/2017 | Saxe | G06N 20/00 |
| 10,432,644 | B2 * | 10/2019 | Burns | H04L 63/107 |
| 10,503,901 | B2 * | 12/2019 | Zhao | G06F 21/56 |
| 10,621,349 | B2 * | 4/2020 | Davis | G06N 5/022 |
| 11,108,809 | B2 * | 8/2021 | Johns | H04L 63/145 |
| 11,132,293 | B2 * | 9/2021 | Shuster | G06F 12/0253 |
| 11,165,813 | B2 * | 11/2021 | Stolarz | G06N 5/043 |
| 2018/0211041 | A1 * | 7/2018 | Davis | G06F 21/564 |

OTHER PUBLICATIONS

Shulmin et al., "Steganography in Contemporary Cyberattacks", downloaded on Apr. 26, 2019 from https://securelist.com/steganography-in-contemporary-cyberattacks/79276/.

* cited by examiner

*Primary Examiner* — Hosuk Song
(74) *Attorney, Agent, or Firm* — Ryan, Mason & Lewis, LLP

(57) ABSTRACT

Techniques are provided for detecting malicious software code embedded in image files, using machine learning. One method comprises obtaining metadata for an image file; applying the obtained metadata to at least one machine learning technique to classify the image file into at least one of a plurality of predefined classes, wherein the plurality of predefined classes comprises at least one malicious file class; and determining whether the image file comprises malicious software code based on the classification. The machine learning technique can be trained using image files classified into at least one of the plurality of predefined classes. The machine learning technique may employ a deep neural network and/or a convolutional neural network to classify the image file into the at least one predefined class.

20 Claims, 5 Drawing Sheets

DETECTING AND MITIGATING MALICIOUS SOFTWARE CODE EMBEDDED IN IMAGE FILES USING MACHINE LEARNING TECHNIQUES

FIELD

The field relates generally to the detection of malware in information processing systems.

BACKGROUND

Cyber attackers aim to ensure that their malicious code goes undetected by antivirus detection mechanisms and can thereby achieve its goal. Thus, cyber attackers have invested in more complex infection processes, going beyond the traditional phishing techniques and increasingly employing new techniques where the malicious code is hidden inside files (even using a known file format). Thus, such new malware types, sometimes referred to as steganography cyber attacks, often aim to conceal the malicious files in image files, such as a Portable Network Graphic (PNG) image format. Steganography cyber attacks allow the cyber attackers to successfully conceal the malware inside a file that appears to be a regular PNG image.

Steganography is now popular with malware and spyware writers. Existing anti-malware tools generally, and perimeter security tools specifically, can do very little with steganography carriers. Such carriers are very difficult to detect, as they look like regular image files. The content of an image file could be changed in such a way that the image file will be opened as an image, but with the malware hidden in the image (and without the user's ability to know that the hidden malware is in the opened image).

A need exists for improved techniques for detecting malicious software code embedded in image files using machine learning techniques, and for mitigating the effects of such detected malicious software code.

SUMMARY

In one embodiment, a method comprises obtaining metadata for an image file; applying the obtained metadata to at least one machine learning technique to classify the image file into at least one of a plurality of predefined classes, wherein the plurality of predefined classes comprises at least one malicious file class; and determining whether the image file comprises malicious software code based on the classification.

In some embodiments, the machine learning technique is trained using image files classified into at least one of the plurality of predefined classes. The machine learning technique employs one or more of a deep neural network and a convolutional neural network to classify the image file into the at least one predefined class.

Other illustrative embodiments include, without limitation, apparatus, systems, methods and computer program products comprising processor-readable storage media.

DETAILED DESCRIPTION

Figure 1:
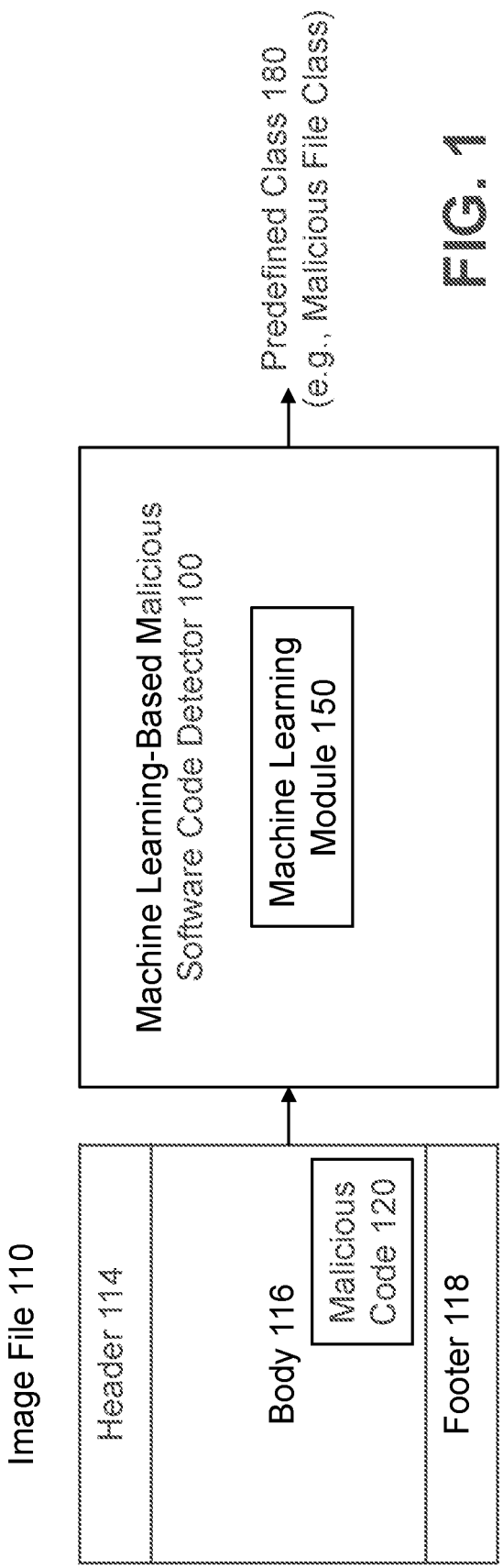
FIG. 1 illustrates an exemplary machine learning-based malicious software code detector, according to an embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for detecting malicious software code embedded in image files, using machine learning techniques.

In one or more embodiments, techniques are provided for detecting malicious software code embedded in image files using machine learning techniques, and for mitigating the effects of such detected malicious software code. In some embodiments, the employed machine learning techniques are trained to classify image files into at least one of a plurality of predefined classes, such as a malicious file class.

While PNG images, for example, are often considered straightforward and are widely used, they have great appeal for malware infection, as the actual image, even following an infection, appears regular and legitimate. In this manner, attackers can execute their malware code using the image, and also do so without the user becoming aware of the malware hidden in the files. In addition, malware and security attacks are created so quickly that existing static defense solutions are insufficient.

PNG images are known to comprise a header, a footer and a body. The special structure of PNG images allows an attacker to hide malicious code in a way that is very hard to detect. Any code placed in the header or footer of a PNG image is executed when the image opens, and is more easily detected. Malicious changes to the body of the code, however, will not affect the image visuals and will not be executed when the file opens (and are therefore harder to detect). An additional simple malware file typically extracts the malicious code from the body of the PNG file to enable the execution of the malicious code at a later time. For example, the malicious code extracted from the body of the PNG file may be opened in memory and executed without creating a footprint.

One or more aspects of the disclosure recognize that when a cyber attacker wants to insert a malware file with code lines that will not be detected by an anti-virus mechanism, the cyber attacker must deploy the malware file to an organization masking the malware file inside a "safe" file, such as a PNG image. The attacker will use the unique structure of the image to hide the malicious code in the body of the image. In addition to that image, the attacker will use a short code/executer that will not look suspicious, as the short code/executer is only opening an image and manipulating the opened image. In this manner, the attacker can run the malicious code hidden in the body of an image.

While one or more embodiments of the disclosure are illustrated in the context of PNG image files, the disclosed techniques for detecting malicious software code embedded in image files can be employed with any image file types, as would be apparent to a person of ordinary skill in the art.

A cyber attacker can employ steganography methods based on, for example, a least significant bit (LSB) technique, and a Discrete cosine transform. For a more detailed discussion of current steganography threats, see, for example, Alexey Shulmin and Evgeniya Krylova, "Steganography in Contemporary Cyberattacks," downloadable from securelist.com (Aug. 3, 2017), incorporated by reference herein in its entirety.

There are various technical and conceptual problems with current approaches. For example, most existing antivirus mechanisms are signature based and use characteristics of a file to create a static fingerprint for known malware. One limitation of this approach is that they are not able to detect malware infected files for which signatures are not yet created. All steganography detection programs today are essentially proof-of-concept, and their logic cannot be implemented in commercial security tools because they are slow and have fairly low detection rates.

In addition, existing intrusion detection systems (IDSs) are not trying to detect malware within the body of an image, as it is a complex task. Existing IDSs try to open suspicious files and see if they activate malicious code, but malicious code in the body of an image is not executable by only opening the image. Hence, it is hard to detect and more sophisticated methods are required (only malicious code in the header or footer of an image will be executed when opening an image).

Using existing detection methods, malware infected images can only be detected when the infected images are compared to the original, uninfected image. When it comes to an infected image for which information on the original clean image is unavailable (often referred to as "first-seen images"), the malware cannot be detected, because the file structure would be the same as for a legitimate image file.

Cyber criminals have techniques that enable them to infect a PNG file, and still make the PNG file open when initiated by the user. When this malicious PNG file opens, the user will see the image, as expected. Therefore, the user does not become aware of the fact that there is malicious code hidden in the image, and that the user is exposed to a cyberattack.

Furthermore, users are wise and experienced to be suspicious when it comes to traditional phishing, and malware techniques, for example. Users do not expect the malware to exist in a PNG file, however, especially when an infected image could look completely the same as a legitimate image.

In some cases, the PNG file size or other characteristics of the PNG file would change after malware infection. Sophisticated attackers, however, could infect the file without changing its size (or other characteristics), making it impossible to detect malicious PNG files based only on the metadata of the file.

Infected PNG files could cause a small visual difference in the image, but not to an extent that the differences can be seen by human vision. The image would appear to be completely legitimate to the user, even when the image is actually hiding malware.

In one or more embodiments, techniques are provided for detecting malicious software code embedded in the body segment of image files, such as PNG files, using machine learning techniques. Generally, the machine learning techniques learn common patterns related to malicious images and clean images, as discussed further below.

FIG. 1 illustrates an exemplary machine learning-based malicious software code detector 100, according to an embodiment of the disclosure. As shown in FIG. 1, the exemplary machine learning-based malicious software code detector 100 processes one or more image files 110. The exemplary image file 110 comprises a header 114, a body 116 and a footer 118, in a known manner (for example, for the exemplary PNG image files).

As shown in FIG. 1, the body 116 of the exemplary image file 110 comprises a hidden malicious code 120 that has been embedded in image file 110, for example, by a cyber attacker. Generally, as noted above, the hidden malicious code 120 embedded in the body of the image file 110 will not be executed when the image first opens, and therefore will go undetected by current intrusion defense systems. An additional, relatively simple, non-suspicious malicious file is used by cyber attackers to activate the hidden malicious code 120, to provide a sophisticated and dangerous attack that can be easily undetected by an IDS.

As shown in FIG. 1, the exemplary machine learning-based malicious software code detector 100 comprises a machine learning module 150 that employs at least one machine learning technique to classify the image file 110 into at least one of a plurality of predefined classes 180, including at least one malicious file class, as discussed further below in conjunction with FIG. 2. The exemplary machine learning module 150 may be implemented, for example, using one or more convolutional neural networks (CNN). Generally, CNNs use features of the visual cortex and CNNs have been employed for image classification. One or more aspects of the present disclosure recognize that a CNN can be used to identify image features that classify malware within an image into a malicious file class.

Figure 2:
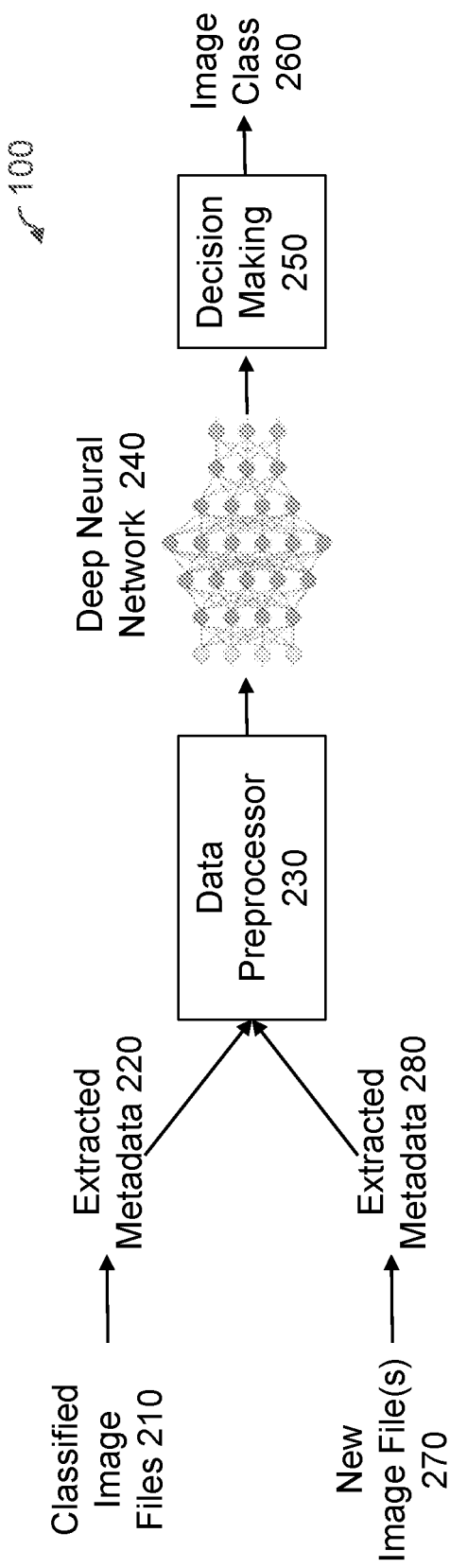
FIG. 2 illustrates the exemplary machine learning-based malicious software code detector of FIG. 1 in further detail, according to some embodiments.

FIG. 2 illustrates the exemplary machine learning-based malicious software code detector 100 of FIG. 1 in further detail, according to some embodiments. As shown in FIG. 2, the exemplary machine learning-based malicious software code detector 100 initially processes multiple classified image files 210, such as historical files where the class of each image file 210 is already known.

Metadata 220 is extracted from the multiple classified image files 210 and the extracted metadata 220 is preprocessed by a data preprocessor 230 into a format employed by at least one machine learning technique used by a deep neural network (DNN) 240. The data is preprocessed, for example, to filter out-of-range values and missing values so that the data is compatible for the machine learning algorithm. The preprocessed extracted metadata 220 is used to train a classification model of the DNN 240 that can be used to classify new (unclassified) image files 270. CNNs have a pattern recognition ability for classification and can find malware or clean image patterns in image files. A decision-making process 250 evaluates the output of the DNN 240 and assigns an image class 260 to the new image files 270.

In some embodiments, the following exemplary metadata will be extracted as features from the classified image files 210, as well as the new image files 270:

appearance of code words, such as English words, in the image code (code words are translated into features, for example, using Natural Language Processing (NLP) techniques, such as "bag of words"); and a code textual density, for example, computed for each code area, as malware images are expected to contain at least one code area in which the code density changes (when compressed, malware is hidden in the image) (generally, code density refers to how many processor instructions and space it takes to perform a requested code action; if there is one or more code areas in which the code density increased, the image may contain malware).

Thus, as evident from FIG. 2, in some embodiments, the detection of malicious software code embedded in the body segment of image files comprises the following exemplary stages:

1. Metadata collection to create the extracted metadata 220, 280;
2. Data preprocessing at data processor 230 to prepare the raw data in the extracted metadata 220, 280 for the machine learning system;
3. Deep learning using the DNN 240, trained based on the classified images files 210 and then applied to classify new image files 270; and
4. Decision making process 250, based on the results from the machine learning portion of the DNN 240, will make a decision as to whether or not the current image file comprises malware.

Figure 3:
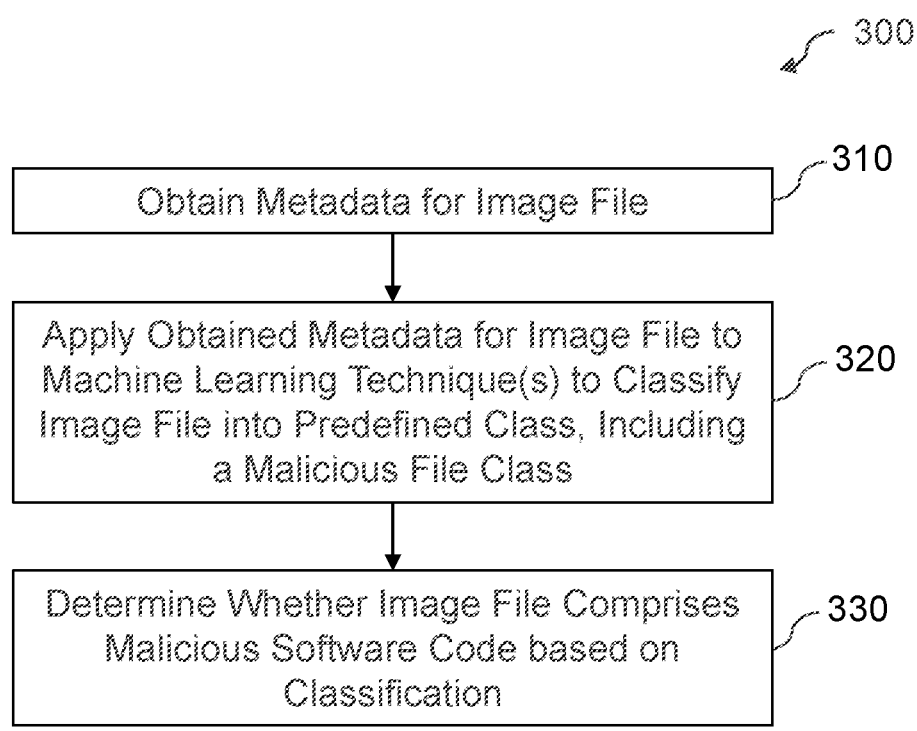
FIG. 3 is a flow chart illustrating an exemplary implementation of an embedded malicious code detection process, according to one embodiment of the disclosure.

FIG. 3 is a flow chart illustrating an exemplary implementation of an embedded malicious code detection process 300, according to one embodiment of the disclosure. As shown in FIG. 3, the exemplary embedded malicious code detection process 300 initially obtains metadata for an image file during step 310.

Thereafter, the embedded malicious code detection process 300 applies the obtained metadata for the image file to one or more machine learning techniques to classify the image file during step 320 into at least one predefined class, including at least one malicious file class. Finally, during step 330, a determination is made as to whether the image file comprises malicious software code based on the classification.

If an image file is determined to comprise malicious software code, the exemplary embedded malicious code detection process 300 can optionally perform one or more remedial actions on the input file, such as isolating the input file, removing the input file, applying a quarantine on the input file, limiting the permissions associated with the input file, analyzing the file in a sandbox environment and deleting the input file.

The particular processing operations and other network functionality described in conjunction with the flow diagram of FIG. 3 are presented by way of illustrative example only, and should not be construed as limiting the scope of the disclosure in any way. Alternative embodiments can use other types of processing operations to evaluate image files for the presence of malware using machine learning techniques. For example, the ordering of the process steps may be varied in other embodiments, or certain steps may be performed concurrently with one another rather than serially.

One or more embodiments of the disclosure provide techniques for detecting malicious software code embedded in image files using machine learning techniques. In some embodiments, the machine learning techniques identify patterns in the code of an image file that are analyzed to classify the image file as a clean file or a malicious file. The patterns are optionally detected using a deep learning approach, that detects objects (even minor ones) in an image file, and leverages the detected objects to detect malware code or clean images patterns. Once a malicious file is detected, a cyber analyst can investigate the attacker and the attack methods, or other remedial actions can be deployed, as described above.

As noted above, one or more aspects of the disclosure recognize that CNNs are a special architecture of artificial neural networks that can be employed for image classification. In the context of the present disclosure, a CNN is employed in one or more embodiments to classify an image file to one of multiple available classes that the CNN algorithm was trained on, including at last one malicious file class. The pattern recognition aspects of the CNN allow a classification of the input image file 110, for example, as malware or a clean image.

Among other benefits, the disclosed techniques for detecting malicious software code embedded in the body segment of image files, using machine learning techniques, allows malware to be detected in an input image file 110, even if the machine learning-based malicious software code detector 100 is not familiar with the original, clean version of the image (e.g., by recognizing repeated patterns in previously seen clean images and malware infected images that were used to train the DNN 240).

One or more embodiments of the disclosure provide improved methods, apparatus and computer program products for detecting malicious software code embedded in image files, such as PNG files, using machine learning techniques. The foregoing applications and associated embodiments should be considered as illustrative only, and numerous other embodiments can be configured using the techniques disclosed herein, in a wide variety of different applications.

It should also be understood that the disclosed malware detection techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for malware detection may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based malware detection engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based malware detection platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. These platforms may also be used to implement at least portions of other information processing systems in other embodiments.

Figure 4:
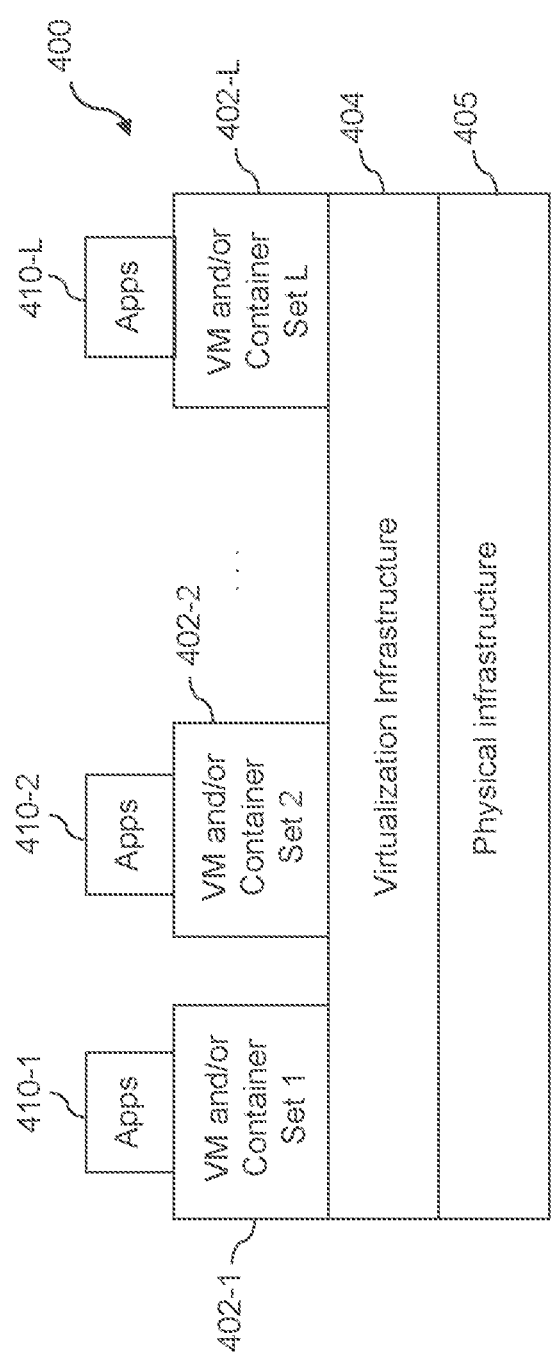
FIG. 4 illustrates an exemplary processing platform that may be used to implement at least a portion of one or more embodiments of the disclosure comprising a cloud infrastructure.

FIG. 4 shows an example processing platform comprising cloud infrastructure 400. The cloud infrastructure 400 comprises a combination of physical and virtual processing resources that may be utilized to implement at least a portion of an information processing system. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. Such implementations can provide malware detection functionality of the type described above for one or more processes running on a given one of the VMs. For example, each of the VMs can implement malware detection control logic and associated trained machine learning models for providing malware detection functionality for one or more processes running on that particular VM.

An example of a hypervisor platform that may be used to implement a hypervisor within the virtualization infrastructure 404 is the VMware® vSphere® which may have an associated virtual infrastructure management system such as the VMware® vCenter™. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system. Such implementations can provide malware detection functionality of the type described above for one or more processes running on different ones of the containers. For example, a container host device supporting multiple containers of one or more container sets can implement one or more instances of malware detection control logic and associated trained machine learning models for use malware detection.

As is apparent from the above, one or more of the processing modules or other components of machine learning-based malicious software code detector 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises at least a portion of the given system and includes a plurality of processing devices, denoted 502-1, 502-2, 502-3, . . . 502-K, which communicate with one another over a network 504. The network 504 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 502-1 in the processing platform 500 comprises a processor 510 coupled to a memory 512. The processor 510 may comprise a microprocessor, a microcontroller, an application specific integrated circuit (ASIC), a field programmable gate array (FPGA) or other type of processing circuitry, as well as portions or combinations of such circuitry elements, and the memory 512, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and the given system may include additional or alternative processing platforms, as well as numerous distinct processing platforms in any combination, with each such platform comprising one or more computers, storage devices or other processing devices.

Figure 5:
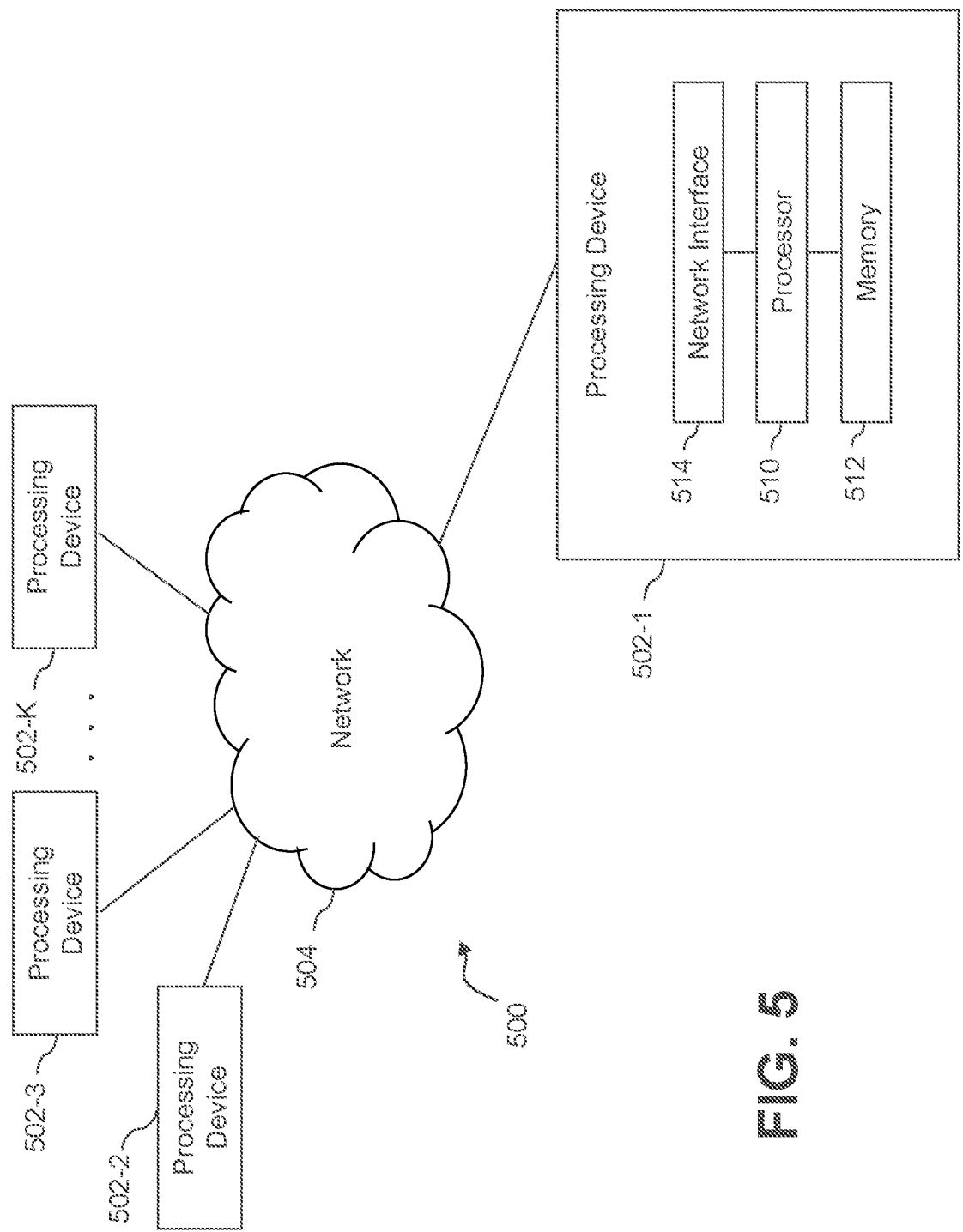
FIG. 5 illustrates another exemplary processing platform that may be used to implement at least a portion of one or more embodiments of the disclosure.

Multiple elements of an information processing system may be collectively implemented on a common processing platform of the type shown in FIG. 4 or 5, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining metadata for a visual image file, wherein the obtained metadata for the visual image file comprises one or more of words from software code within the visual image file and a code textual density measure of software code within the visual image file;
    applying, using at least one processing device, the obtained metadata to at least one machine learning technique to classify the visual image file into at least one of a plurality of predefined classes, wherein the plurality of predefined classes comprises at least one malicious file class; and
    determining, using the at least one processing device, whether the visual image file comprises malicious software code based on the classification;
    wherein the method is performed by at least one processing device comprising a processor coupled to a memory.

2. The method of claim 1, wherein the at least one machine learning technique employs at least one trained machine learning model that is trained using visual image files classified into at least one of the plurality of predefined classes.

3. The method of claim 1, wherein at least one machine learning technique identifies repeated patterns in one or more of software code in a body of the visual image file and features in the body of the visual image file.

4. The method of claim 1, wherein the at least one machine learning technique employs a deep neural network.

5. The method of claim 1, wherein the at least one machine learning technique employs a convolutional neural network to classify the visual image file into the at least one predefined class.

6. The method of claim 1, further comprising the step of pre-processing the obtained metadata into a format employed by the at least one machine learning technique.

7. The method of claim 6, wherein the pre-processing the obtained metadata comprises removing one or more of at least one filter out-of-range value and at least one missing value.

8. A computer program product, comprising a tangible machine-readable storage medium having encoded therein executable code of one or more software programs, wherein the one or more software programs when executed by at least one processing device perform the following steps:
    obtaining metadata for a visual image file, wherein the obtained metadata for the visual image file comprises one or more of words from software code within the visual image file and a code textual density measure of software code within the visual image file;
    applying, using at least one processing device, the obtained metadata to at least one machine learning technique to classify the visual image file into at least one of a plurality of predefined classes, wherein the plurality of predefined classes comprises at least one malicious file class; and
    determining, using the at least one processing device, whether the visual image file comprises malicious software code based on the classification.

9. The computer program product of claim 8, wherein the at least one machine learning technique employs at least one trained machine learning model that is trained using visual image files classified into at least one of the plurality of predefined classes.

10. The computer program product of claim 8, wherein at least one machine learning technique identifies repeated patterns in one or more of software code in a body of the visual image file and features in the body of the visual image file.

11. The computer program product of claim 8, wherein the at least one machine learning technique employs a convolutional neural network to classify the visual image file into the at least one predefined class.

12. The computer program product of claim 8, further comprising the step of pre-processing the obtained metadata into a format employed by the at least one machine learning technique.

13. The computer program product of claim 12, wherein the pre-processing the obtained metadata comprises removing one or more of at least one filter out-of-range value and at least one missing value.

14. An apparatus, comprising:
a memory; and
at least one processing device, coupled to the memory, operative to implement the following steps:
obtaining metadata for a visual image file, wherein the obtained metadata for the visual image file comprises one or more of words from software code within the visual image file and a code textual density measure of software code within the visual image file;
applying, using at least one processing device, the obtained metadata to at least one machine learning technique to classify the visual image file into at least one of a plurality of predefined classes, wherein the plurality of predefined classes comprises at least one malicious file class; and
determining, using the at least one processing device, whether the visual image file comprises malicious software code based on the classification.

15. The apparatus of claim 14, wherein the at least one machine learning technique employs at least one trained machine learning model that is trained using visual image files classified into at least one of the plurality of predefined classes.

16. The apparatus of claim 14, wherein at least one machine learning technique identifies repeated patterns in one or more of software code in a body of the visual image file and features in the body of the visual image file.

17. The apparatus of claim 14, wherein the at least one machine learning technique employs a deep neural network.

18. The apparatus of claim 14, wherein the at least one machine learning technique employs a convolutional neural network to classify the visual image file into the at least one predefined class.

19. The apparatus of claim 14, further comprising the step of pre-processing the obtained metadata into a format employed by the at least one machine learning technique.

20. The apparatus of claim 19, wherein the pre-processing the obtained metadata comprises removing one or more of at least one filter out-of-range value and at least one missing value.

\* \* \* \* \*